US012675849B2

(12) United States Patent
Mok et al.

(10) Patent No.: US 12,675,849 B2
(45) Date of Patent: Jul. 7, 2026

(54) IMAGE DENOISING METHOD, ELECTRONIC DEVICE AND STORAGE MEDIUM

(71) Applicant: UNIVERSITY OF MACAU, Macau (CN)

(72) Inventors: Seng Peng Mok, Macau (CN); Yu Du, Macau (CN)

(73) Assignee: UNIVERSITY OF MACAU, Macau (CN)

( * ) Notice: Subject to any disclaimer, the term of this patent is extended or adjusted under 35 U.S.C. 154(b) by 252 days.

(21) Appl. No.: 18/679,491

(22) Filed: May 31, 2024

(65) Prior Publication Data

US 2025/0371676 A1      Dec. 4, 2025

(51) Int. Cl.
| | |
|---|---|
| *G06T 5/60* | (2024.01) |
| *G06T 5/10* | (2006.01) |
| *G06T 5/50* | (2006.01) |
| *G06T 5/70* | (2024.01) |

(52) U.S. Cl.
CPC ................. *G06T 5/60* (2024.01); *G06T 5/10* (2013.01); *G06T 5/50* (2013.01); *G06T 5/70* (2024.01); *G06T 2207/10108* (2013.01); *G06T 2207/20081* (2013.01)

(58) Field of Classification Search
CPC .... G06T 5/60; G06T 5/10; G06T 5/50; G06T 5/70; G06T 2207/10108; G06T 2207/20081; G06T 2207/10104; G06T 2207/20084
See application file for complete search history.

(56) References Cited

U.S. PATENT DOCUMENTS

| | | | |
|---|---|---|---|
| 10,891,762 B2 | 1/2021 | Park et al. | |
| 10,949,951 B2 | 3/2021 | Tang et al. | |
| 11,308,587 B2 | 4/2022 | Pei et al. | |
| 2021/0290191 A1* | 9/2021 | Qi | A61B 6/032 |
| 2024/0095887 A1* | 3/2024 | Wong | G06T 5/70 |

FOREIGN PATENT DOCUMENTS

| | | | | |
|---|---|---|---|---|
| WO | WO-2019134879 A1 * | 7/2019 | ............. | G16H 50/30 |
| WO | WO-2021061710 A1 * | 4/2021 | ......... | G01R 33/5608 |

OTHER PUBLICATIONS

Wang, Yan, et al. "3D conditional generative adversarial networks for high-quality PET image estimation at low dose." Neuroimage 174 (2018): 550-562.*

Xiang, Lei, et al. "Deep auto-context convolutional neural networks for standard-dose PET image estimation from low-dose PET/MRI." Neurocomputing 267 (2017): 406-416.*

Yu Du et al., Frequency specific denoising for myocardial perfusion SPECT using deep learning, Journal of Nuclear Medicine, Jun. 2023, p. 831, vol. 64, Issue supplement 1.

* cited by examiner

*Primary Examiner* — Shefali D Goradia

(57) ABSTRACT

The present disclosure discloses an image denoising method, an electronic device and a storage medium, the method including: acquiring a preset quantity of full dose images and low dose images; training a preset deep learning model according to the full dose images and the low dose images, wherein the deep learning model includes a multi-frequency band denoising network, and the multi-frequency band denoising network includes one multi-frequency band separation module, N denoising modules and one summation module; and acquiring an image to be denoised, and denoising the image to be denoised through the multi-frequency band denoising network in a trained deep learning model.

16 Claims, 7 Drawing Sheets

| |
|---|
| Acquiring a preset quantity of full dose images and low dose images —— S101 |

↓

| Training a preset deep learning model according to the full dose images and the low dose images —— S102 |

↓

| Acquiring an image to be denoised, and denoising the image to be denoised through the multi-frequency band denoising network in a trained deep learning model —— S103 |

Multi-frequency denoising with AttGAN (AttGAN-MF)

Multi-frequency separation (MFS)

IMAGE DENOISING METHOD, ELECTRONIC DEVICE AND STORAGE MEDIUM

STATEMENT REGARDING PRIOR DISCLOSURES BY AN INVENTOR OR JOINT INVENTOR

This invention was described in a printed publication by the inventor in June 2023 entitled "Frequency specific denoising for myocardial perfusion SPECT using deep learning" on jnm.snmjournals.org.

TECHNICAL FIELD

The present disclosure relates to image processing, and in particular to an image denoising method, an electronic device and a storage medium, which can be applied to denoising processing of medical images such as SPECT images.

BACKGROUND ART

The statements in this section merely provide background information related to the present disclosure and may not necessarily constitute prior art.

MP SPECT (Myocardial perfusion Single-Photon Emission Computed Tomography) is a well-established non-invasive method for the diagnosis of cardiovascular diseases. However, in order to obtain sufficient photon counts and high quality MP SPECT images, relatively long acquisition times (15-20 minutes for NaI SPECT) and high radiotracer injection volumes are required, leading to discomfort of a patient, potential mismatch with fast helical CT scans, and radiation exposure issues. Although the scan time can be significantly reduced (3-6 minutes) by using a dedicated cardiac scanner with a CZT detector, it is still much longer than the CT scan time.

Low dose (LD) and fast MP SPECT are ideal choices, but Poisson noise increases as the quantity of detected photons decreases, thereby reducing quantification accuracy and image quality, affecting subsequent clinical diagnosis.

Deep learning (DL)-based denoising methods have been shown to improve image quality and quantification accuracy for low dose SPECT images. However, all conventional denoising methods based on deep learning are performed for SPECT images with mixed frequency components, ignoring the different noise distributions of low and high frequency components in SPECT images.

SUMMARY OF THE INVENTION

In a first aspect, the present disclosure provides an image denoising method based on deep learning, including:

acquiring a preset quantity of full dose images and low dose images;

training a preset deep learning model according to the full dose images and the low dose images, wherein the deep learning model includes a multi-frequency band denoising network, and the multi-frequency band denoising network includes one multi-frequency band separation module, N denoising modules and one summation module, wherein the multi-frequency band separation module is configured for performing frequency separation on input low dose images to obtain single-frequency band low dose images corresponding to N different frequency bands, wherein N is an integer greater than 1; the N denoising modules respectively correspond to the N different frequency bands on a one-to-one basis, and the N denoising modules are configured for respectively denoising the single-frequency band low dose images corresponding to the N different frequency bands; and the summation module is configured for superimposing the single-frequency band low dose images corresponding to the N different frequency bands after denoising so as to obtain a final denoised image; the single-frequency band of full and low dose images are paired for training; and acquiring an image to be denoised, and denoising the image to be denoised through the multi-frequency band denoising network in a trained deep learning model.

In a second aspect, the present disclosure provides an electronic device, the electronic device including:

one or more processors; and a storage means for storing one or more programs, wherein when the one or more programs are executed by the one or more processors, the one or more processors implement the image denoising method as provided in the first aspect.

In a third aspect, the present disclosure further provides a computer-readable storage medium having stored thereon a computer program, wherein the computer program, when executed by a processor, implements the image denoising method as provided in the first aspect.

According to the above-mentioned aspects disclosed in the present disclosure, by separating an image into different frequency band components, respectively performing denoising, and then adding the denoised different frequency band components to obtain the final denoised image, the denoising effect can be greatly improved.

DETAILED DESCRIPTION OF THE INVENTION

Figure 1:
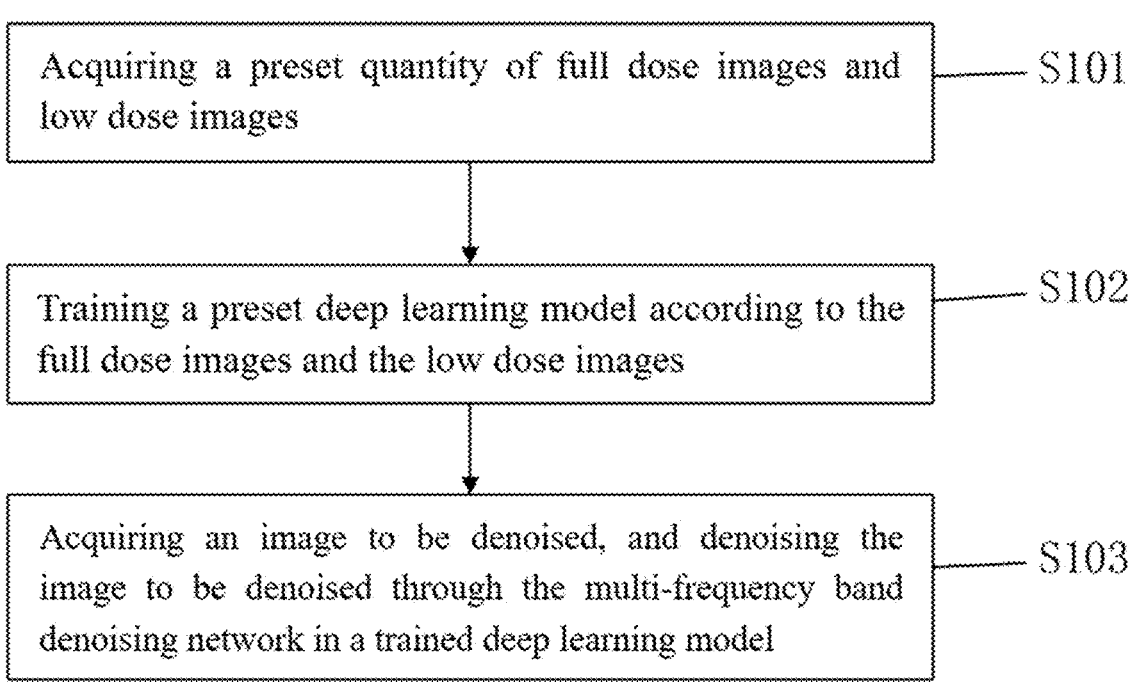
FIG. 1 is a flowchart of an image denoising method provided by the present disclosure.

The present disclosure is further illustrated in detail in combination with the drawings and the embodiments. It should be understood that the particular embodiments described herein are illustrative only and are not restrictive to the present disclosure. It should also be noted that, for ease of description, only some, but not all, of the structures associated with the present disclosure are shown in the drawings.

Before discussing exemplary embodiments in more detail, it should be noted that some exemplary embodiments are described as processes or methods depicted as flowcharts. Although a flowchart depicts the steps as a sequential process, many of the steps can be performed in parallel, concurrently or simultaneously. Further, the order of the steps may be rearranged. The processing may be terminated when its operations are completed, but may also have additional steps not included in the drawings. A processing may correspond to a method, a function, a procedure, a subroutine, a subprogram, etc.

Furthermore, the terms "first", "second", and the like, may be used herein to describe various directions, acts, steps, or elements, and the like, but such directions, acts, steps, or elements are not limited by such terms. These terms are only used to distinguish one direction, act, step or element from another direction, act, step or element. For example, the first information may be referred to as second information, and similarly, the second information may be referred to as first information, without departing from the scope of the present disclosure. Both the first information and the second information are information, but they are not the same information. The terms "first", "second" and the like are not to be construed as indicating or implying relative importance or implicitly indicating the quantity of technical features indicated. Thus, features defined with "first" or "second" may explicitly or implicitly include one or more of the feature. In the description of the present disclosure, the meaning of "plurality" is at least two, such as two, three, and the like, unless obviously and specifically limited otherwise.

FIG. 1 shows a flowchart of an image denoising method based on deep learning of the present disclosure, as shown, comprising the following steps:

S101: acquiring a preset quantity of full dose images and low dose images.

Specifically, a preset quantity of full dose images are acquired according to preset injection dose, scanning direction and image acquisition period. In one example, the injection dose is 1184 MBq, the scanning direction is from a front right oblique angle to a rear left oblique angle of 180°, and the image acquisition period is 10 seconds, namely, the routine stress SPECT/CT scanning is performed on CZT SPECT/CT system. After the injection of 1184 MBq $^{99m}$Tc-sestamibi, the images are acquired every 10 seconds from the front right oblique angle to the rear left oblique angle of 180°, and a total of 60 images are acquired as full dose images.

Low dose images, in some alternative embodiments, can be acquired by shortening the image acquisition period by a multiple of 2, 5 or 10, namely, the injection dose and scanning direction are unchanged, the image acquisition period is shortened to 5 seconds, 2 seconds or 1 second, and a total of 60 images are acquired as low dose images. In other alternative embodiments, low dose images may be acquired by reducing the injection dose by a multiple of 2, 5, or 10, namely, an injection dose of 592 MBq, 236.8 MBq, or 118.4 MBq with an unchanged scanning direction and image acquisition period, for a total of 60 images which are acquired as the low dose images.

S102: training a preset deep learning model according to the full dose images and the low dose images.

Figure 2:
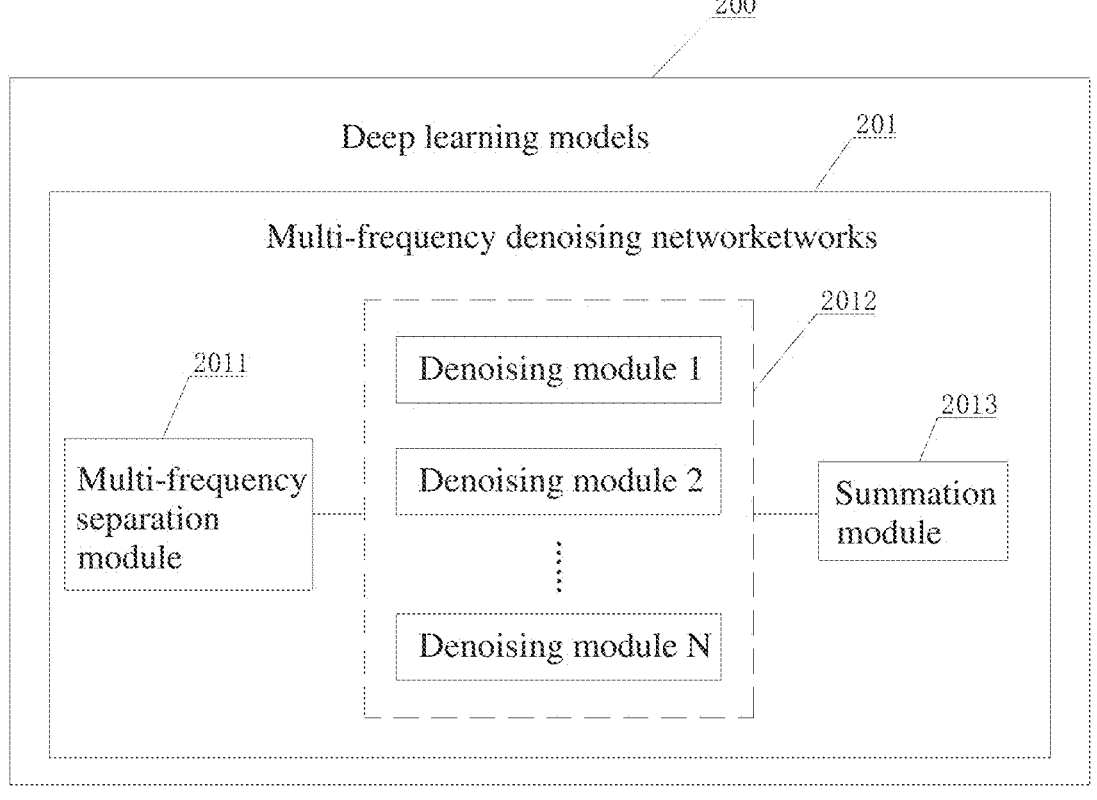
FIG. 2 illustrates a schematic structural diagram of a deep learning model of one embodiment.

FIG. 2 illustrates a schematic structural diagram of a deep learning model of one embodiment. As shown, the deep learning model 200 includes a multi-frequency band denoising network 201 including one multi-frequency band separation module 2011, N denoising modules 2012, and one summation module 2013, where N is an integer greater than 1. The multi-frequency band separation module 2011 is configured for performing frequency band separation on input low dose images to obtain single-frequency band low dose images corresponding to N different frequency bands; the N denoising modules 2012 respectively correspond to the N different frequency bands on a one-to-one basis, and the N denoising modules 2012 are configured for respectively denoising the single-frequency band low dose images corresponding to the N different frequency bands; and the summation module 2013 is configured for superimposing the single-frequency band low dose images corresponding to the N different frequency bands after denoising so as to obtain a final denoised image.

Figures 3, 4:
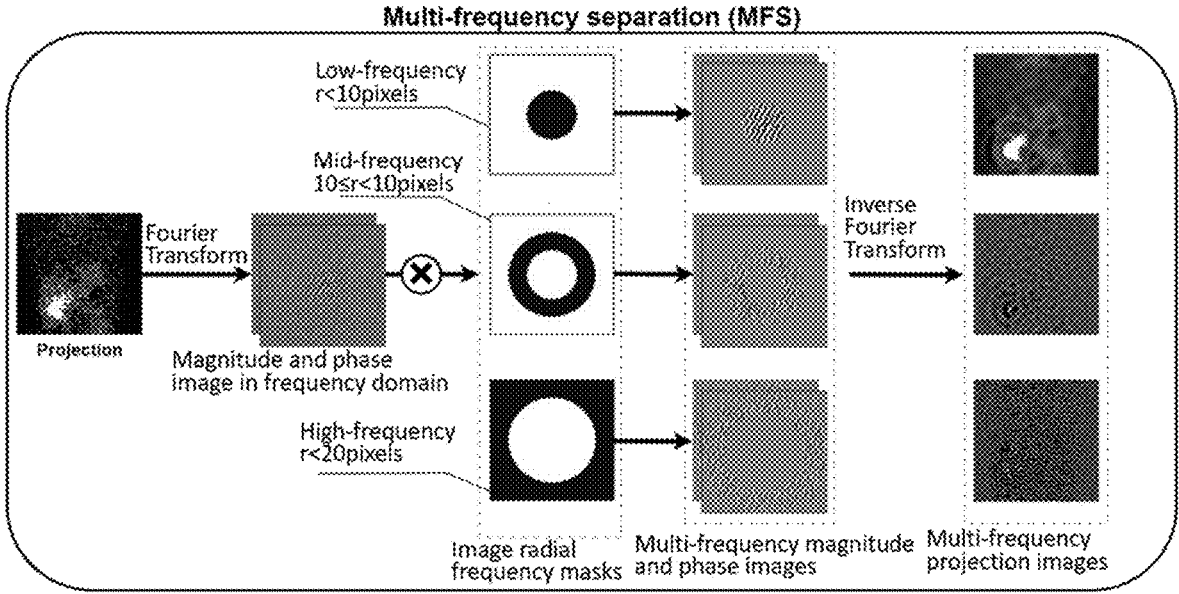
FIG. 3 illustrates a schematic flow diagram of image processing of the deep learning model of one embodiment.
FIG. 4 illustrates a schematic flow diagram of image processing of a multi-frequency band separation module of one embodiment.

FIG. 3 illustrates a schematic flow diagram of image processing of the deep learning model of one embodiment. Firstly, an input low dose image is subjected to frequency band separation through the multi-frequency band separation module to obtain single-frequency band low dose images of N different frequency bands. In the example shown in FIG. 3, three single-frequency band low dose images of different frequency bands are obtained, respectively being a low frequency, a medium frequency and a high frequency. Then, three single-frequency band low dose images are denoised through three denoising modules corresponding to three different frequency bands on a one-to-one basis. Finally, the final denoised image is obtained through superimposing three single-frequency band low dose images after denoising through the summation module.

FIG. 4 illustrates a schematic flow diagram of image processing of the multi-frequency band separation module. As shown, firstly, the input image is converted into an amplitude image and a phase image through a Fourier transform algorithm. In one embodiment, a fast Fourier transform algorithm (FFT) is adopted. Then, a center of the amplitude image and the phase image is taken as a circle center, and the amplitude image and the phase image are respectively separated into N different frequency bands through N radial frequency masks with different radii. In one embodiment, a mask having a radius less than 10 voxels and a mask having a radius greater than or equal to 10 voxels are used to separate the amplitude image and the phase image into two frequency bands, which may be referred to as low frequency and high frequency, respectively. In the example shown in FIG. 4, the amplitude image and the phase image are separated into three frequency bands, referred to as the low frequency, the medium frequency, and the high frequency, using a mask having a radius less than 10 voxels, a mask having a radius greater than or equal to 10 voxels and less than 20 voxels, and a mask having a radius greater than 20 voxels. Finally, the amplitude image and the phase image of a same frequency band are converted into a single-frequency band image corresponding to the same frequency band through an inverse Fourier transform algorithm to obtain single-frequency band images of N different frequency bands.

In one embodiment, the multi-frequency band separation module is further configured for performing frequency separation on the full dose images to obtain single-frequency band full dose images corresponding to N different frequency bands for subsequently calculating a loss value of the denoising module.

Figure 5:
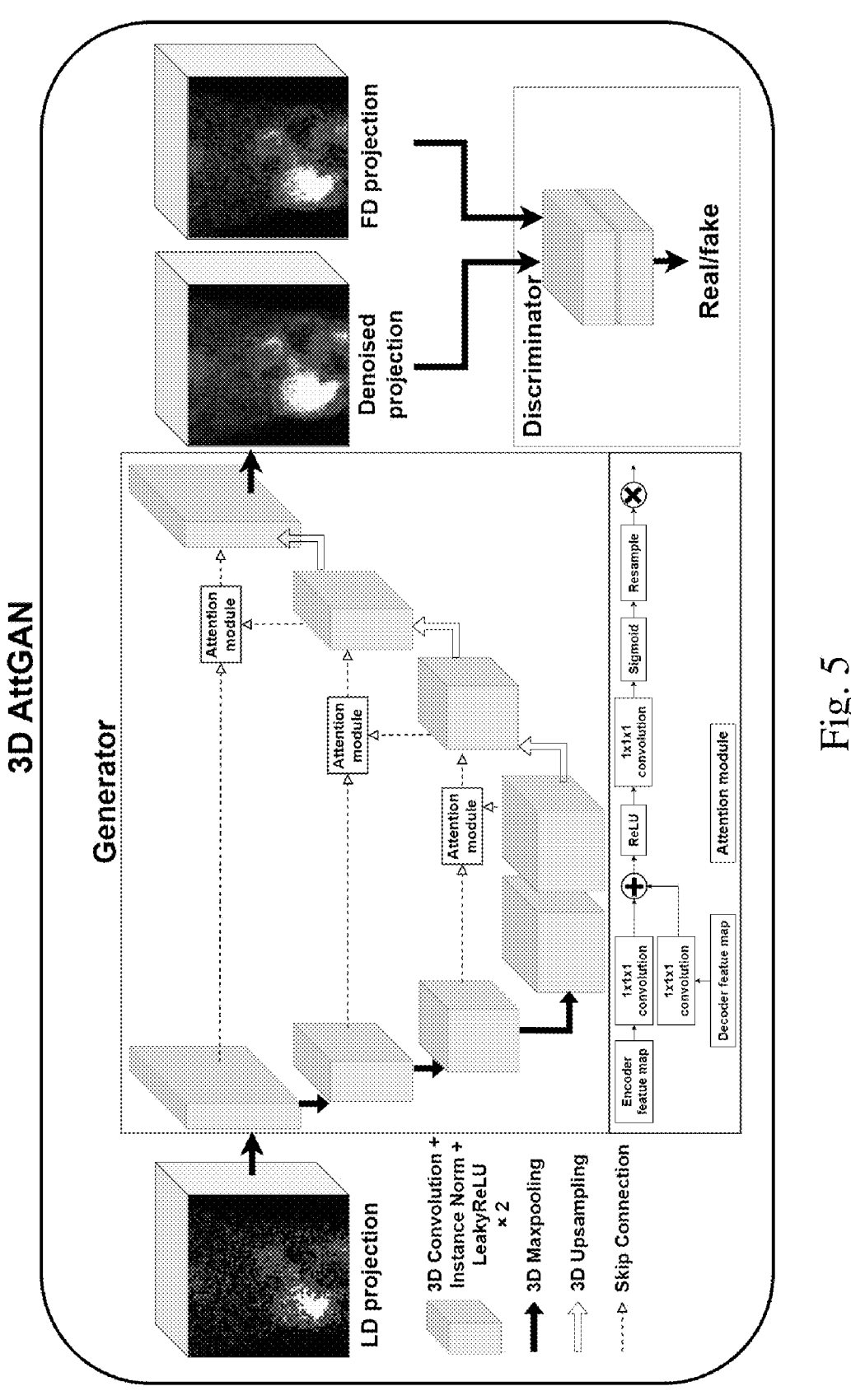
FIG. 5 illustrates a schematic flow diagram of image processing of a denoising module of one embodiment.

In the example shown in FIG. 3, the denoising module adopts AttGAN (attention-guided conditional generative adversarial network). In other optional embodiments, other GANs can also be adopted. In one embodiment, 3D AttGAN is implemented by adding an attention module in 3D cGAN (conditional generative adversarial network). FIG. 5 shows a schematic flow diagram of an image processing of Att-GAN, wherein the AttGAN includes a generator (G) and a discriminator (D), wherein the generator (G) is configured for denoising the input low dose images (LD) and outputting a denoised image; and the discriminator (D) is configured for discriminating an authenticity of the image output by the generator (G) from the full dose images (FD). The loss function of AttGAN is expressed as:

$$L_{AttGAN} = BCE(D(G(LD))) + \lambda MAE(G(LD), FD)$$

where BCE represents a binary cross entropy loss of the discriminator (D), MAE represents a mean absolute error loss of the generator (G), and $\lambda$ is a weight value corresponding to the generator (G).

Since the multi-frequency band denoising network includes N denoising modules corresponding to N different frequency bands on a one-to-one basis, the loss function of the denoising modules corresponding to different frequency bands can be expressed as:

$$L_{AttGAN-f} = BCE(D_f(G_f(LD_f))) + \lambda MAE(G_f(LD_f), FD_f), f \in F$$

where $L_{AttGAN-f}$ represents a loss value of the denoising module corresponding to a frequency band f, $LD_f$ represents the single-frequency band low dose image corresponding to the frequency band f, $G_f(LD_f)$ represents the single-frequency band low dose image corresponding to the frequency band f after denoising, $FD_f$ represents the single-frequency band full dose image corresponding to the frequency band f, and F represents a set of N different frequency bands. In an alternative embodiment, F={low-freq, high-freq}. In another alternative embodiment, F={low-freq, mid-freq, high-freq}. BCE($D_f(G_f(LD_f))$) represents a binary cross entropy loss of the discriminator $D_f$ in the denoising module corresponding to the frequency band f, MAE($G_f(LD_f)$, $FD_f$) represents a mean absolute error loss of the generator $G_f$ in the denoising module corresponding to the frequency band f, and $\lambda$ is a preset weight value. In one embodiment, $\lambda$=20.

After calculating the loss values of the denoising modules corresponding to the N different frequency bands, parameter update is respectively performed on the N denoising modules on a one-to-one basis according to the loss values of the N denoising modules, namely, parameter update is performed on the denoising module corresponding to a frequency band according to the loss value of the denoising module corresponding to the frequency band so as to complete a training. In one embodiment, training is terminated when the training rounds reach 200.

In other alternative embodiments, the denoising module may also employ CNN or U-Net. In an alternative embodiment, the hyperparameter settings for all networks of the U-Net based denoising module are a 3-layer encoder-decoder depth and a quantity of 32 feature maps with an initial learning rate of 0.001, all networks being implemented using the Tensorflow framework.

Figure 6:
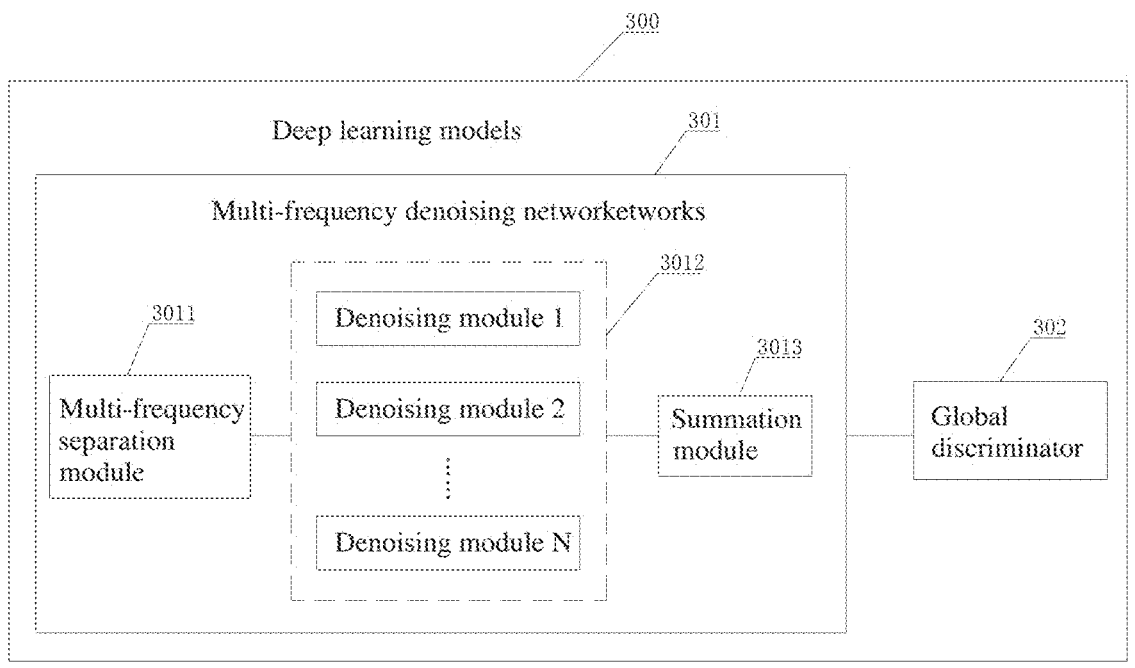
FIG. 6 illustrates a schematic structural diagram of a deep learning model of another embodiment.

FIG. 6 illustrates a schematic structural diagram of a deep learning model of another embodiment. As shown, the deep learning model 300 includes a multi-frequency band denoising network 301 and a global discriminator 302, the multi-frequency band denoising network 301 including one multi-frequency band separation module 3011, N denoising modules 3012, and one summation module 3013, where N is an integer greater than 1. The global discriminator 302 assists training only in the training phase, and does not work in the application phase, namely, the denoising is achieved only through the multi-frequency band denoising network 301 in the application phase.

Figure 7:
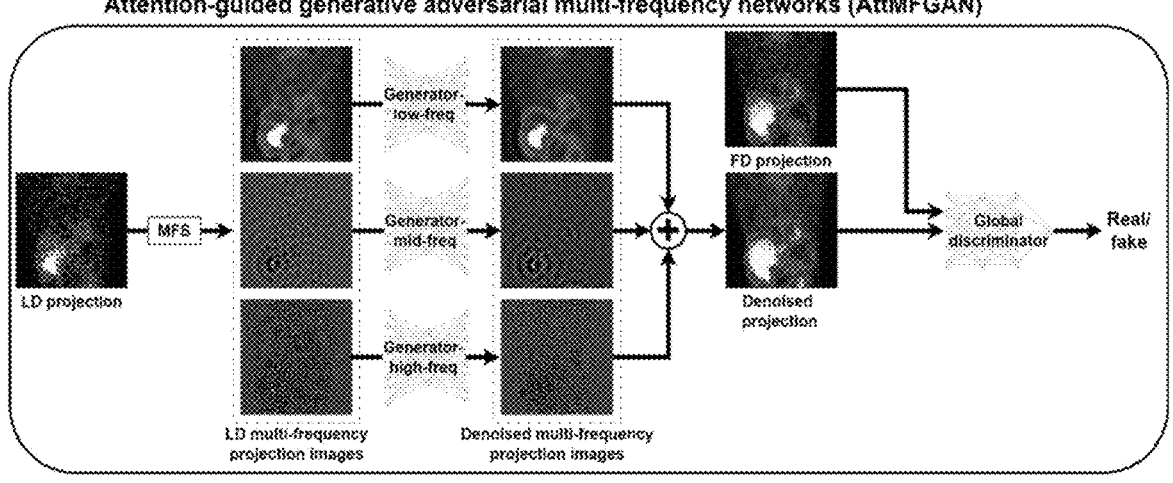
FIG. 7 illustrates a schematic flow diagram of image processing of the deep learning model of another embodiment.

FIG. 7 illustrates a schematic flow diagram of image processing of the deep learning model of another embodiment. As shown, firstly, an input low dose image is subjected to frequency separation through the multi-frequency band separation module to obtain single-frequency band low dose images of N different frequency bands. In the example shown in FIG. 7, three single-frequency band low dose images of different frequency bands are obtained, respectively being a low frequency, a medium frequency and a high frequency. Then, three single-frequency band low dose images are denoised through three denoising modules (generator-low-freq, generator-mid-freq, generator-high-freq) corresponding to three different frequency bands on a one-to-one basis. Then, the final denoised image is obtained through superimposing three single-frequency band low dose images after denoising through the summation module. Finally, the final denoised image is taken as an input to the global discriminator, which discriminates the authenticity of the final denoised image based on the full dose images (FD).

In the example shown in FIG. 7, the denoising module adopts a generator in AttGAN, and the global discriminator adopts a discriminator in AttGAN. A loss function of the denoising modules corresponding to different frequency bands is as follows:

$$L_{AttMFGAN-f} = BCE\left(D\left(\sum_{f \in F} G_f(LD_f)\right)\right) +$$
$$\lambda_1 MAE(G_f(LD_f), FD_f) + \lambda_2 MAE\left(\sum_{f \in F} G_f(LD_f), FD\right), f \in F$$

where $L_{AttMFGAN-f}$ represents a loss value of the denoising module corresponding to the frequency band f, $LD_f$ represents the single-frequency band low dose image corresponding to the frequency band f, $G_f(LD_f)$ represents the single-frequency band low dose image corresponding to the frequency band f after denoising by the denoising module ($G_f$) corresponding to the frequency band f, $\sum_{f \in F} G_f(LD_f)$ represents the final denoised image output by the summation module, $FD_f$ represents the single-frequency band full dose image corresponding to the frequency band f, FD represents an original full dose image, and F represents a set of N different frequency bands; BCE($D(\sum_{f \in F} G_f(LD_f))$) represents the binary cross entropy loss of the global discriminator D; MAE($G_f(LD_f)$, $FD_f$) represents a local loss between the single-frequency band low dose image $G_f(LD_f)$ corresponding to the frequency band f after denoising and the single-frequency band full dose image $FD_f$ corresponding to the frequency band f, MAE($\sum_{f \in F} G_f(LD_f)$, FD) represents a global loss between the final denoised image $\sum_{f \in F} G_f(LD_f)$ and the original full dose image FD, and $\lambda_1$ and $\lambda_2$ are preset weight values. In one embodiment, $\lambda_1 = \lambda_2 = 10$.

After calculating the loss values of the denoising modules corresponding to the N different frequency bands, parameter update is respectively performed on the N denoising modules on a one-to-one basis according to the loss values of the N denoising modules, and, at the same time, according to the binary cross entropy loss of the global discriminator D, parameter update is performed on the global discriminator so as to complete a training.

S103: acquiring an image to be denoised, and denoising the image to be denoised through the multi-frequency band denoising network in a trained deep learning model.

Further, in order to facilitate diagnosis by medical personnel, a step of reconstructing the image is also included. In some alternative embodiments, the reconstruction is performed by a 3D OS-EM (ordered subset-expectation maximization) algorithm, running up to 5 iterations and 4 subsets.

Figure 8:
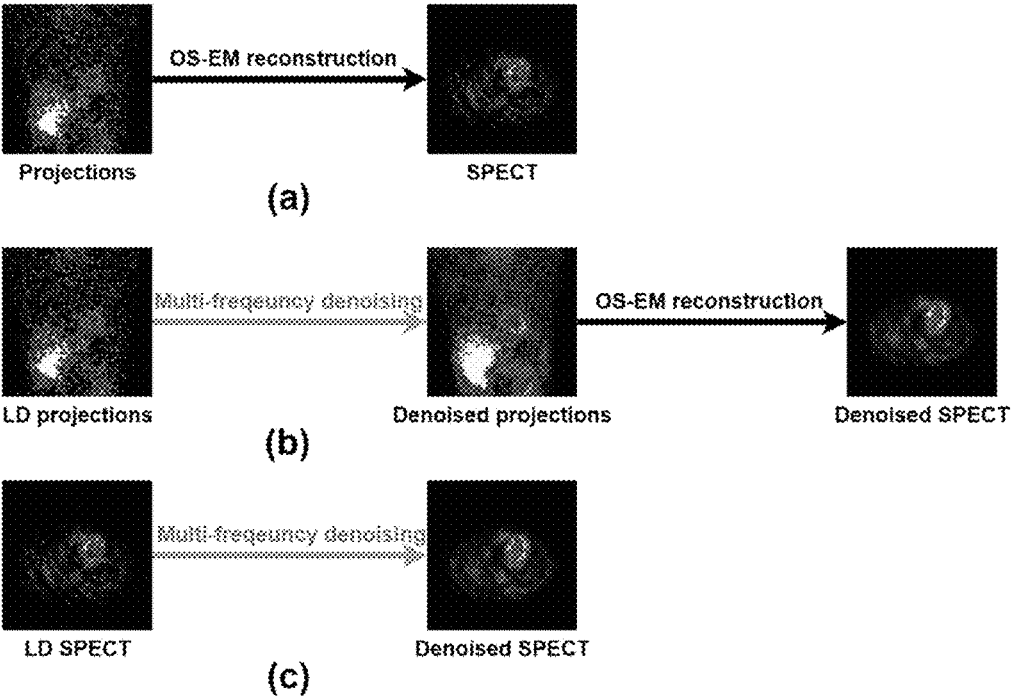
FIG. 8 illustrates a schematic diagram before and after image reconstruction.

FIG. 8 illustrates a schematic diagram before and after image reconstruction. In one embodiment, after the image to be denoised is acquired, the reconstruction is performed on the image to be denoised first, as shown in (a) in FIG. 8; then denoising is performed by the multi-frequency band denoising network in a trained deep learning model. Accordingly, in the model training phase, the image input to the model is reconstructed and then input to the deep learning model, and the deep learning model denoises the reconstructed low dose image, as shown in (c) in FIG. 8. In another embodiment, the image to be denoised is first denoised, and then the image to be denoised after denoising is reconstructed, as shown in (b) in FIG. 8.

Figure 9:
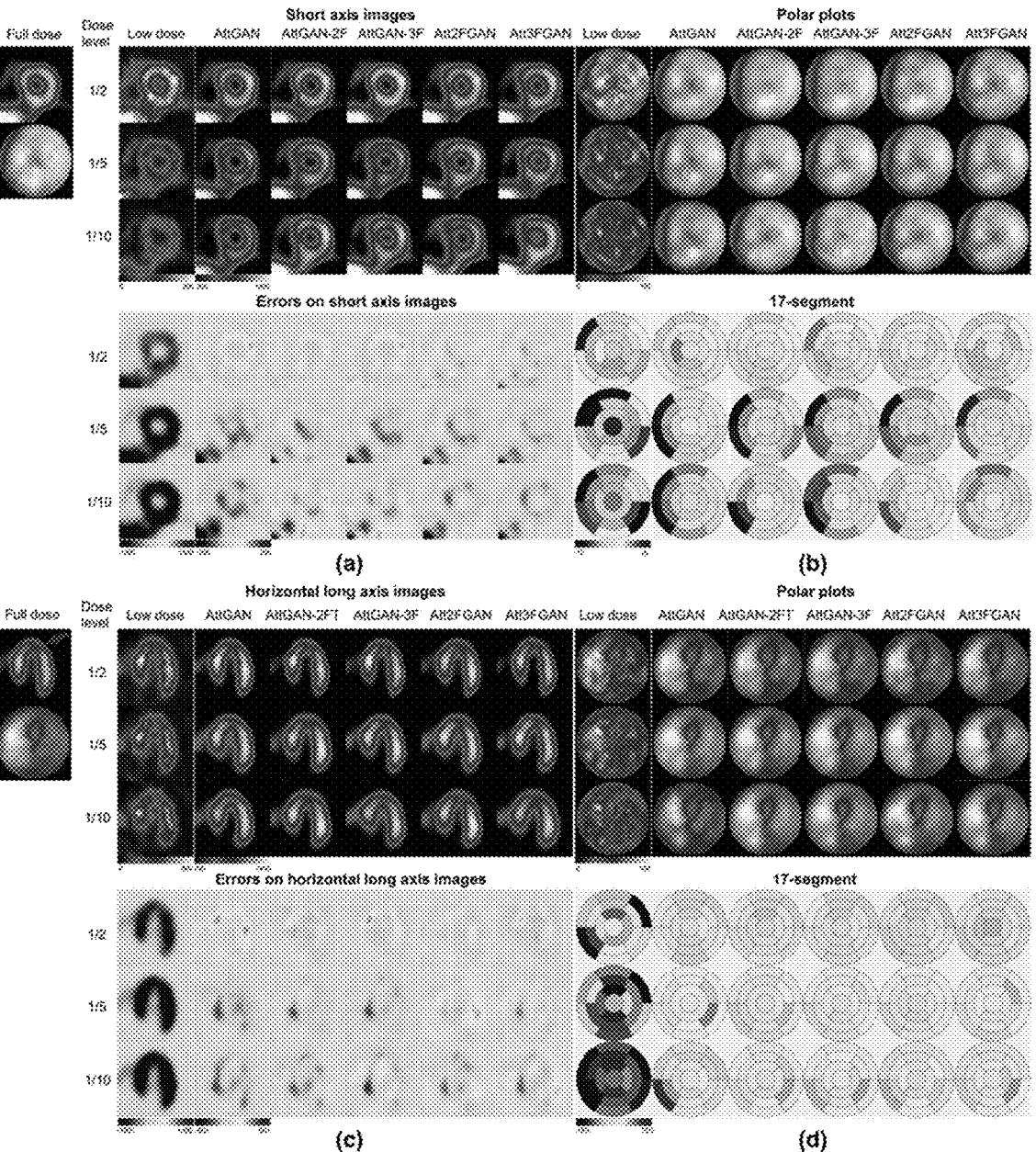
FIG. 9 illustrates a schematic comparison diagram of SPECT images of two patients.

FIG. 9 shows a schematic comparison diagram of SPECT images of a normal patient with another patient with a defective interventricular septum, where (a) in FIG. 9 shows a comparison of short axis images (top) and corresponding error maps (bottom) after denoising by different denoising methods with full dose images of a normal male patient (BMI=19.2 kg/m2, age=76 years), and (b) in FIG. 9 shows corresponding polar plots (top) of different denoising methods and 17-segment error maps with full dose images of the same patient (bottom); (c) in FIG. 9 and (d) in FIG. 9 are schematic diagrams of the corresponding results for another male patient (body mass index=24.2 kg/m$^2$, age=81 years) with a defect in the interventricular septum of the heart (at the arrow in the full dose image).

It can be seen from FIG. 9 that compared with low dose images, the image denoised by AttGAN-MF (namely, the deep learning model shown in FIG. 2, AttGAN-2F being the model when N=2, and AttGAN-3F being the model when N=3) shows a smaller error in a myocardial region of a short axis (SA) or horizontal long axis (HLA) image, while AttMFGAN (namely, the deep learning model shown in FIG. 6, Att2FGAN being the model when N=2, and Att3FGAN being the model when N=3) further improves the denoising performance, showing a smaller error on the SA image than AttGAN-MF. For polar plots, the deviation of AttMFGAN in the 17-segment analysis is generally less than that of AttGAN-MF, followed by low dose images.

Figure 10:
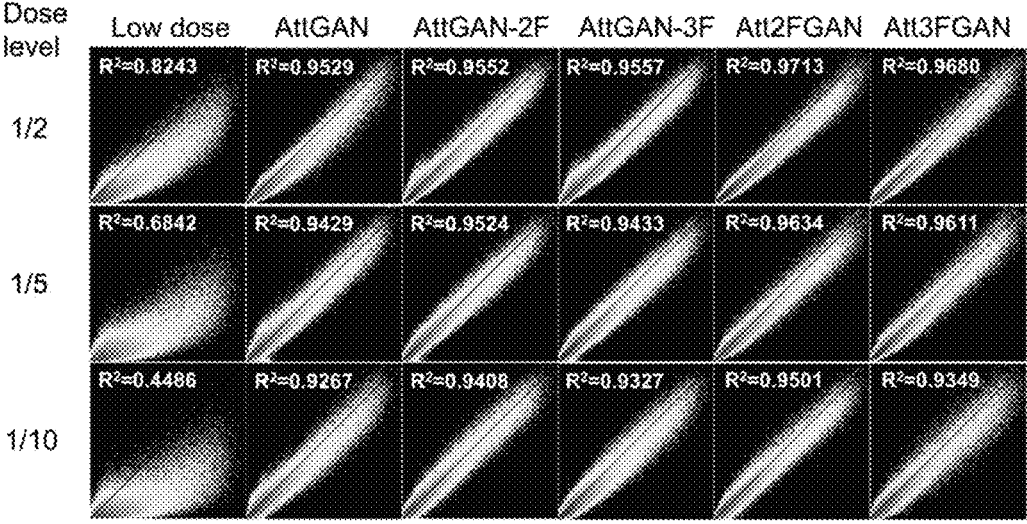
FIG. 10 illustrates a schematic result diagram of joint histogram and linear regression of low dose images and denoised images.
Figure 11:
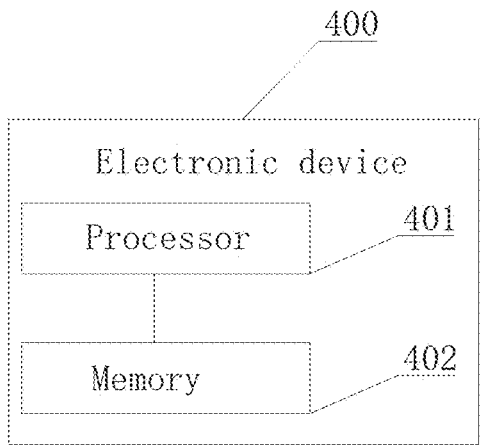
FIG. 11 is a schematic structural diagram of an electronic device provided by the present disclosure.

FIG. 10 shows a schematic diagram of the results of joint histogram and linear regression of low dose images and cardiac VOI denoised by different denoising methods with reference to filtered full dose images. As can be seen from FIG. 10, the joint histogram and linear regression results for AttMFGAN are the best with the narrowest distribution of voxel counts and the highest R$^2$ values compared to the full dose images. A result of Att2FGAN is better than that of Att3FGAN. Further, the present disclosure provides an electronic device 400, as shown in FIG. 11, the electronic device 400 including:

one or more processors 401; and a memory means 402 for storing one or more programs, When the one or more programs are executed by the one or more processors 401, the one or more processors 401 implement the respective processes in the image denoising method embodiment as described above, and can achieve the same technical effect, and in order to avoid repetition, the description thereof will not be repeated.

Furthermore, the present disclosure also provides a computer-readable storage medium, on which a computer program is stored, which, when executed by a processor, implements the various steps of the image denoising method as in the above-mentioned embodiment, and can achieve the same technical effect, and will not be described repeatedly here.

From the above-mentioned description of implementations, it will be clear to a person skilled in the art that the present disclosure can be implemented by means of software and the necessary general-purpose hardware and, of course, also by means of hardware, the former being in many cases a better implementation. Based on such an understanding, the technical solutions of the present disclosure, either per se or by parts that are making a contribution to the prior art, may be embodied in the form of a software product, and the computer software product may be stored in a computer-readable storage medium, such as a floppy disk, a read-only memory (ROM), a random access memory (RAM), a FLASH, a hard disk or an optical disk of a computer, including several instructions to cause a computer device, which may be a personal computer, a server, or a network device, to perform the methods of the various embodiments of the present disclosure.

It should be noted that in the embodiments of the above-mentioned device, the various units and modules included are merely divided according to functional logic, but are not limited to the above-mentioned division, as long as corresponding functions can be realized; in addition, the specific names of each functional unit are merely taken for facilitating mutual distinction, and are not intended to limit the scope of protection of the present disclosure.

The above-mentioned description is merely an example of the present disclosure, and does not limit the scope of patent of the present disclosure. Any equivalent transformation made by using the contents of the description and the drawings of the present disclosure or directly or indirectly used in the relevant technical field is likewise included in the scope of the patent protection of the present disclosure.

What is claimed is:

1. An image denoising method based on deep learning, comprising:

acquiring a preset quantity of full dose images and low dose images;

training a preset deep learning model according to the full dose images and the low dose images, wherein the deep learning model comprises a multi-frequency band denoising network, and the multi-frequency band denoising network comprises one multi-frequency band separation module, N denoising modules and one summation module, wherein the multi-frequency band separation module is configured for performing frequency separation on input low dose images to obtain single-frequency band low dose images corresponding to N different frequency bands, wherein N is an integer greater than 1; the N denoising modules respectively correspond to the N different frequency bands on a one-to-one basis, and the N denoising modules are configured for respectively denoising the single-frequency band low dose images corresponding to the N different frequency bands; and the summation module is configured for superimposing the single-frequency band low dose images corresponding to the N different frequency bands after denoising so as to obtain a final denoised image; and acquiring an image to be denoised, and denoising the image to be denoised through the multi-frequency band denoising network in a trained deep learning model.

2. The image denoising method according to claim 1, wherein the acquiring a preset quantity of full dose images and low dose images comprises:

acquiring a preset quantity of full dose images according to preset injection dose and image acquisition period; and shortening the image acquisition period according to a preset multiple, and acquiring a preset quantity of low dose images according to a shortened image acquisition period and preset injection dose.

3. The image denoising method according to claim 2, wherein the preset multiple is 2, 5 or 10.

4. The image denoising method according to claim 1, wherein the acquiring a preset quantity of full dose images and low dose images comprises:

acquiring a preset quantity of full dose images according to preset injection dose and image acquisition period; and reducing the injection dose according to a preset multiple, and acquiring a preset quantity of low dose images according to a reduced injection dose and preset image acquisition period.

5. The image denoising method according to claim 4, wherein the preset multiple is 2, 5 or 10.

6. The image denoising method according to claim 1, wherein the multi-frequency band separation module is specifically configured for:

converting the input low dose images into an amplitude image and a phase image through a Fourier transform algorithm;

taking a center of the amplitude image and the phase image as a circle center, and respectively separating the amplitude image and the phase image into N different frequency bands through N radial frequency masks with different radii; and converting the amplitude image and the phase image of a same frequency band into a single-frequency band low dose image corresponding to the same frequency band through an inverse Fourier transform algorithm.

7. The image denoising method according to claim 1, wherein the denoising module adopts GAN, CNN or U-Net.

8. The image denoising method according to claim 1, wherein the denoising module adopts AttGAN, and the AttGAN comprises a generator and a discriminator; and the multi-frequency band separation module is further configured for performing frequency separation on the full dose images to obtain single-frequency band full dose images corresponding to N different frequency bands.

9. The image denoising method according to claim 8, wherein a loss function of the denoising modules corresponding to different frequency bands is as follows:

$$L_{AttGAN-f} = BCE(D_f(G_f(LD_f))) + \lambda MAE(G_f(LD_f), FD_f), f \in F$$

10 where $L_{AttGAN-f}$ represents a loss value of the denoising module corresponding to a frequency band f, $LD_f$ represents the single-frequency band low dose image corresponding to the frequency band f, $G_f(LD_f)$ represents the single-frequency band low dose image corresponding to the frequency band f after denoising, $FD_f$ represents the single-frequency band full dose image corresponding to the frequency band f, and F represents a set of N different frequency bands; and $BCE(D_f(G_f(LD_f)))$ represents a binary cross entropy loss of the discriminator $D_f$ in the denoising module corresponding to the frequency band f, $MAE(G_f(LD_f), FD_f)$ represents a mean absolute error loss of the generator Gr in the denoising module corresponding to the frequency band f, and $\lambda$ is a preset weight value.

10. The image denoising method according to claim 1, wherein the deep learning model further comprises a global discriminator for discriminating authenticity of the final denoised image according to the full dose images.

11. The image denoising method according to claim 10, wherein the denoising module adopts a generator in AttGAN, and the global discriminator adopts a discriminator in AttGAN; and the multi-frequency band separation module is further configured for performing frequency separation on the full dose images to obtain single-frequency band full dose images corresponding to N different frequency bands.

12. The image denoising method according to claim 11, wherein a loss function of the denoising modules corresponding to different frequency bands is as follows:

$$L_{AttMFGAN-f} = BCE\left(D\left(\sum_{f \in F} G_f(LD_f)\right)\right) + \lambda_1 MAE(G_f(LD_f), FD_f) + \lambda_2 MAE\left(\sum_{f \in F} G_f(LD_f), FD\right), f \in F$$

wherein $L_{AttMFGAN-f}$ represents a loss value of the denoising module corresponding to the frequency band f, $LD_f$ represents the single-frequency band low dose image corresponding to the frequency band f, $G_f(LD_f)$ represents the single-frequency band low dose image corresponding to the frequency band f after denoising, $\sum_{f \in F} G_f(LD_f)$ represents the final denoised image, $FD_f$ represents the single-frequency band full dose image corresponding to the frequency band f, FD represents the full dose image, and F represents a set of N different frequency bands; and $BCE(D(\sum_{f \in F} G_f(LD_f)))$ represents the binary cross entropy loss of the global discriminator D, $MAE(G_f(LD_f), FD_f)$ represents a local loss between $G_f(LD_f)$ and $FD_f$, $MAE(\sum_{f \in F} G_f(LD_f), FD)$ represents a global loss between the final denoised image and the full dose image, and $\lambda_1$ and $\lambda_2$ are preset weight values.

13. The image denoising method according to claim 1, further comprising: performing reconstruction on the low dose images and the full dose images before the low dose images and the full dose images are input into the deep learning model; and performing reconstruction on the image to be denoised before the image to be denoised is input into the trained deep learning model.

14. The image denoising method according to claim 1, wherein reconstruction is performed on the image to be denoised after denoising.

15. An electronic device, comprising:
one or more processors; and
a storage means for storing one or more programs, wherein when the one or more programs are executed by the one or more processors, the one or more processors implement the steps of:

acquiring a preset quantity of full dose images and low dose images;

training a preset deep learning model according to the full dose images and the low dose images, wherein the deep learning model comprises a multi-frequency band denoising network, and the multi-frequency band denoising network comprises one multi-frequency band separation module, N denoising modules and one summation module, wherein the multi-frequency band separation module is configured for performing frequency separation on input low dose images to obtain single-frequency band low dose images corresponding to N different frequency bands, wherein N is an integer greater than 1; the N denoising modules respectively correspond to the N different frequency bands on a one-to-one basis, and the N denoising modules are configured for respectively denoising the single-frequency band low dose images corresponding to the N different frequency bands; and the summation module is configured for superimposing the single-frequency band low dose images corresponding to the N different frequency bands after denoising so as to obtain a final denoised image; and acquiring an image to be denoised, and denoising the image to be denoised through the multi-frequency band denoising network in a trained deep learning model.

16. A non-transitory computer-readable storage medium having stored thereon a computer program, wherein the computer program, when executed by a processor, implements the steps of:

acquiring a preset quantity of full dose images and low dose images;

training a preset deep learning model according to the full dose images and the low dose images, wherein the deep learning model comprises a multi-frequency band denoising network, and the multi-frequency band denoising network comprises one multi-frequency band separation module, N denoising modules and one summation module, wherein the multi-frequency band separation module is configured for performing frequency separation on input low dose images to obtain single-frequency band low dose images corresponding to N different frequency bands, wherein N is an integer greater than 1; the N denoising modules respectively correspond to the N different frequency bands on a one-to-one basis, and the N denoising modules are configured for respectively denoising the single-frequency band low dose images corresponding to the N different frequency bands; and the summation module is configured for superimposing the single-frequency band low dose images corresponding to the N different frequency bands after denoising so as to obtain a final denoised image; and acquiring an image to be denoised, and denoising the image to be denoised through the multi-frequency band denoising network in a trained deep learning model.

* * * * *